D. L. Liverman
INVENTOR.

Jan. 12, 1943.  D. L. LIVERMAN  2,308,088
MERCURY LEVELING DEVICE
Filed May 22, 1941  2 Sheets-Sheet 2
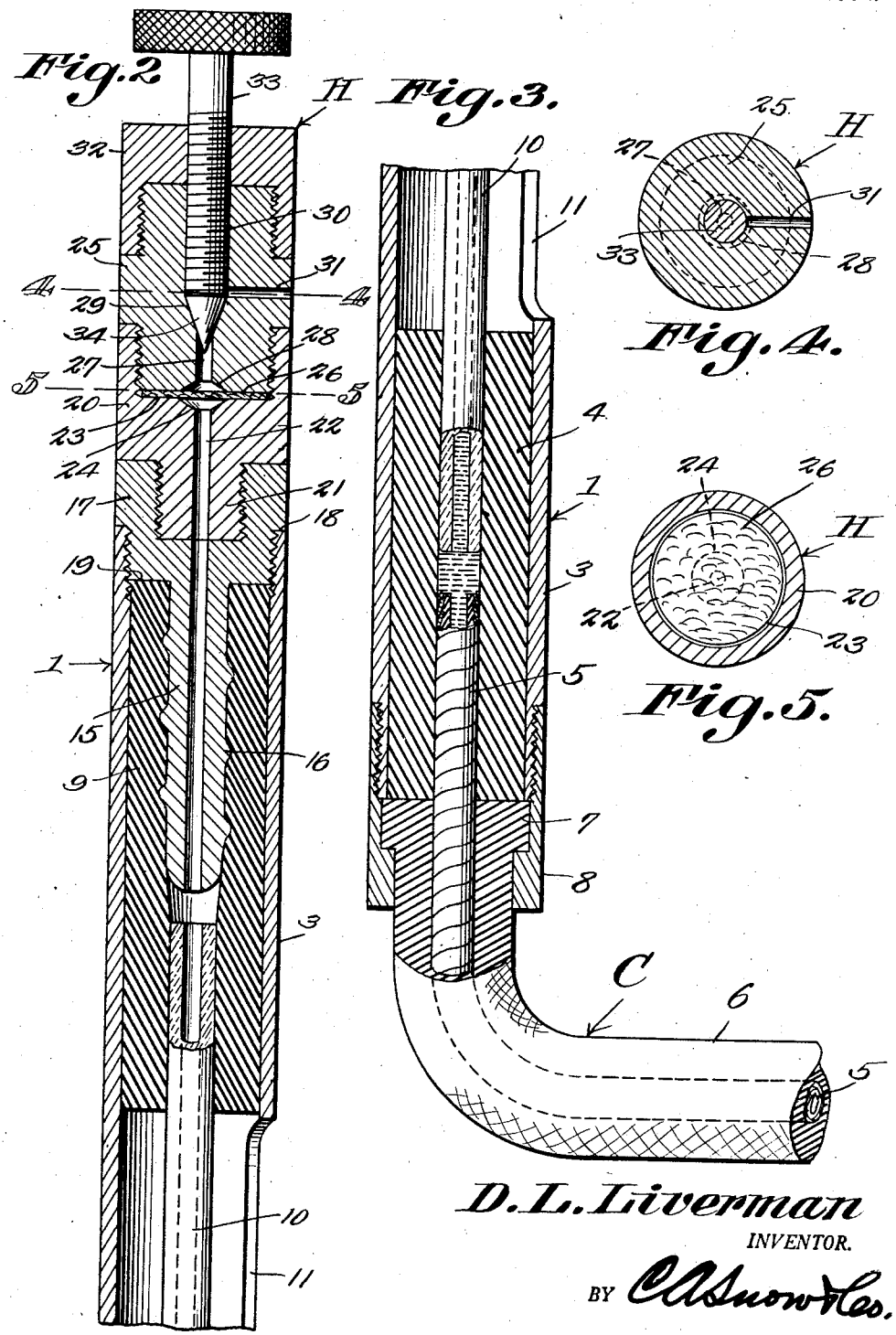
D.L. Liverman
INVENTOR.
BY C.A.Snow&Co.
attys.

Patented Jan. 12, 1943

2,308,088

UNITED STATES PATENT OFFICE 2,308,088

MERCURY LEVELING DEVICE

Dennis Lee Liverman, Norfolk, Va.

Application May 22, 1941, Serial No. 394,715

1 Claim. (Cl. 33—209)

Surveyor's leveling instruments of the tripod or trivet type cannot always be used to advantage in construction work, for example in shipbuilding or airplane building, because the space may be limited, and because something may be interposed in the line of sight. Moreover, a barrier between closely adjacent points of reference will forbid the use of an ordinary mechanic's level.

The present invention aims to provide a novel leveling instrument adapted to be used under conditions such as those hereinbefore outlined, the instrument being of that general type in which a liquid is used in vertical inspection columns connected by a flexible tube.

The invention aims, further, to improve the construction of the columns and of the connecting tubing.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 2 is a longitudinal section of the upper part of one of the columns;

Fig. 3 is a vertical section showing the lower part of the column and a portion of the connecting tubing;

Fig. 4 is a cross section on the line 4—4 of Fig. 2;

Fig. 5 is a cross section on the line 5—5 of Fig. 2.

Figure 1:
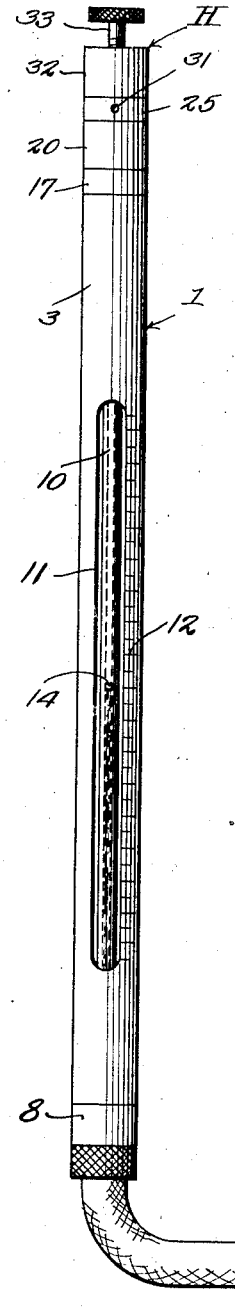
Fig. 1 shows in elevation, a device constructed in accordance with the invention, parts being broken away.
Figure 1:
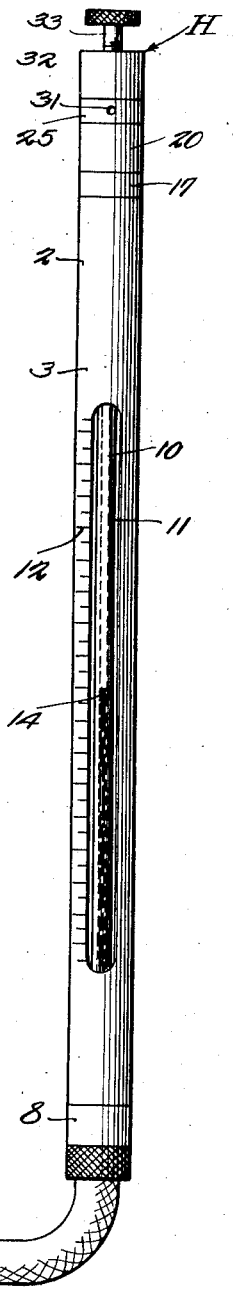

The instrument forming the subject matter of this application comprises inspection columns 1 and 2. Since the columns 1 and 2 are of like construction, and are assembled by like means with the intervening flexible tubing, the description will proceed in the singular number, with reference to the column 1.

The column 1 is a composite structure, including a tubular body 3, preferably made of metal. A tubular packing 4 is secured in the lower end portion of the body 3. A flexible conduit C is provided. The conduit C comprises a flexible, tubular core 5, made of a metal which will not amalgamate with mercury. Throughout most of its length, the core 5 is enclosed in a sheath 6, made of rubber or similar flexible, insulating material, the construction being such that the conduit C will not constitute a conductor, if it happens to come into contact with some part which is electricaly charged.

The core 5 is slightly longer than the sheath 6, and the end of the core is secured in the bore of the packing 4. The sheath 6 has an enlarged button 7, held against the lower end of the body 3, and against the lower end of the packing 4, by a hollow nut 8, which is threaded on the lower end of the body.

A tubular packing 9 is secured in the upper part of the body 3 and, like the packing 4, may be made of rubber. The upper end of a glass vial 10 is secured in the bore of the packing 9, the lower end of the vial being secured in the packing 4. Since the packings 4 and 9 are resilient, shocks of ordinary magnitude will not be transmitted to the frangible vial 10. An elongated opening 11 in the body 3 renders the vial 10 and its contents visible. The body 3 is calibrated as shown at 12, longitudinally of the opening 11, according to any desired system.

The liquid in the vial 10 and the conduit C preferably is mercury. The mercury stands at a place indicated by the numeral 14 in Fig. 1, about halfway between the ends of the opening 11, when the upper ends of the columns 1 and 2 are in the same horizontal plane. Mercury is selected, because it is mobile and durable, replenishments being practically unnecessary. At all places within its length, the instrument is of small cross sectional area. The various bores and passages are of small cross sectional area also. The mercury, therefore, does not increase the weight of the instrument to an objectionable extent. Owing to the cross sectional area of the device, it can be thrust through a correspondingly small hole in any object, for example an opening in the bulkhead of a vessel. The conduit C may be of any desired length, and when the instrument is not in use, it may be coiled down into small compass.

The column 1 comprises a head H, which includes a nozzle 15. The nozzle 15 is secured in the upper end of the bore of the packing 9, and is held the more securely therein, since the nozzle has a spiral rib 16, for engagement with the packing. At its upper end, the nozzle 15 is supplied with a cup 17, threaded into the upper end of the body 3. The cup 17 has an upper shoulder 18, engaging the upper end of the body 3, and a lower shoulder 19, engaging the upper end of the packing 9.

At 20 there appears a cup-shaped connector, including a reduced stem 21 which is threaded into the member 17. The connector 20 is provided with a bore 22, alined with the bore of the nozzle 15. The connector 20 has an internal shoulder 23, the bore 22 being flared, as shown at 24, where it opens upwardly through the shoulder.

The numeral 25 designates a coupling, having a reduced upper end portion, and a reduced lower end portion which is threaded into the connector 20.

A diaphragm 26 is bound between the shoulder 23 and the lower end surface of the coupling 25. The diaphragm 26 is made of kid leather, or similar material, capable of serving as a barrier to the passage of mercury, but permitting the passage of air. The coupling 25 is supplied with a bore 27, having a flared lower part 28, of the same diameter as the flared part 24 of the bore 22. The flared parts 24 and 28 expose a correspondingly enlarged portion of the diaphragm 26 to air proceeding downwardy through the bore 27.

At the upper end of the bore 27, the coupling 25 is supplied with a conical seat 29, and above the seat 29, the coupling is supplied with an enlarged bore 30, leading upwardly through the top of the coupling. A lateral port 31 in the coupling 25 communicates with the bore 30.

A cap 32 is threaded on the upper end of the coupling 25. A needle valve 33 is threaded into the cap 32 and into the bore 30 of the coupling 25, the valve being adapted to close the port 31, and having a pointed end 34, cooperating with the seat 29. A double seal against the entrance of air thus is provided.

The device is used in a well known manner. Operators handling the columns 1 and 2 raise and lower them until the mercury in the instrument stands at a horizontal plane, determined by the calibrations 12. Readings on the calibrations 12 may be used, also, to ascertain differences in level.

The needle valve 33 is backed out, away from the seat 29, and to open the port 31. Air can enter through the port 31 and the bores 27 and 22 to bring about atmospheric pressure on both mercury columns. The diaphragm 26 permits the passage of air, but not the passage of mercury should the instrument be handled carelessly.

When the occasion for the use of the instrument has passed, the valve 33 may be seated, as shown in Fig. 2. This not only closes the air passage represented by the port 31 and the bores 27 and 22, but, as well, if the diaphragm 26 should weaken and break when the device is not in use, the mercury will be prevented from running out by way of the port 31.

The device is simple in construction, but will be found thoroughly advantageous in carrying out the operations hereinbefore alluded to.

What is claimed is:

A leveling instrument comprising inspection columns, a flexible conduit connecting the lower portions of the columns, and liquid in the columns and the conduit: each column comprising a multi-part head having an air passage leading to the space occupied by the liquid, and diaphragms in the heads and defining the upper limits of said space, the diaphragms being interposed in the passages and being bound marginally between said parts of the heads, the diaphragms being made of material which is pervious to air, but a barrier to the liquid, the passages being flared on opposite sides of the diaphragms, to expose increased areas of the diaphragms to air.

DENNIS LEE LIVERMAN.